United States Patent

Tai et al.

[11] Patent Number: 5,860,722
[45] Date of Patent: Jan. 19, 1999

[54] FLAT AND TRANSPARENT FRONT-LIGHTING SYSTEM USING MICROPRISMS

[75] Inventors: Ping-Kaung Tai; Han Zou, both of Toledo, Ohio

[73] Assignee: Clio Technologies, Holland, Ohio

[21] Appl. No.: 824,002

[22] Filed: Mar. 25, 1997

Related U.S. Application Data

[63] Continuation of Ser. No. 255,378, Jun. 8, 1994, Pat. No. 5,671,994.

[51] Int. Cl.$^6$ .................................................. F21V 8/00
[52] U.S. Cl. ............................ 362/31; 362/32; 362/98; 362/260; 362/327; 385/901
[58] Field of Search ............................ 362/26, 29, 30, 362/31, 98, 32, 327, 330, 339, 260; 349/65; 385/146, 901

[56] References Cited

U.S. PATENT DOCUMENTS

| | | | |
|---|---|---|---|
| 3,328,570 | 6/1967 | Balchunas | 362/31 |
| 4,528,617 | 7/1985 | Blackington | 362/32 |
| 5,461,547 | 10/1995 | Ciupke et al. | 362/31 |
| 5,499,165 | 3/1996 | Holmes, Jr. | 362/31 |

*Primary Examiner*—Alan Cariaso
*Attorney, Agent, or Firm*—Marger Johnson & McCollom

[57] ABSTRACT

A system especially suitable for illuminating the front side of an object, as viewed by an observer is disclosed herein. This system includes a light pipe assembly having opposing forward and rearward faces; an arrangement for directing light into the light pipe assembly in a predetermined way; and an arrangement of optical components forming part of the light pipe assembly. This latter assembly is provide for reflecting substantially all of the light directed into the light pipe in a forward direction through the forward face of the light pipe. The light pipe assembly including the arrangement of optical components is substantially transparent to visible light or electro-magnetic wave of a particular wavelength in the direction across the opposing forward and rearward faces of the assembly such that the light pipe assembly can be positioned between the object being illuminated and the observer or the detector without in any significant way disrupting the observer's or detector's view of the object.

8 Claims, 9 Drawing Sheets

DISTORTION AMPUNT = $\overline{AA'} - \overline{BB'}$

FLAT AND TRANSPARENT FRONT-LIGHTING SYSTEM USING MICROPRISMS

This is a continuation of application Ser. No. 08/255,378, filed Jun. 8, 1994, now U.S. Pat. No. 5,671,994.

BACKGROUND OF THE INVENTION

1. Field of the Invention

The invention relates generally to lighting systems and particularly to an efficient, flat and transparent front-lighting system suitable for a wide range of applications such as illuminating automobile meters, road signs, reflective displays, shopping windows, high lighting pictures, jewelry, and art work. It also functions as a see-through lighting system for dentistry and surgery operation, medical and biological inspection tools, and many other applications. It is particularly suitable for precision work in which the conventional method of lighting from the side causes shadows and the parallax effect.

2. Description of the Related Art

The incandescent lamp and the fluorescent lamp are two of the most often used light sources for illumination, although some other light sources, such as light emitting diodes and electro-luminance, are often used for special applications such as indicators for electronic instruments. Most of the light sources, including the fluorescent lamp and the filament of the incandescent lamp are non-transparent. Some of the light sources, in particular, lamps based on gas discharge, such as neon lamps, are transparent when they are in an off state and do not emit light. These light sources, however, still can not be used as transparent, direct front-lighting systems since, when emitting light and placed between the viewer and the object, they will emit an equal amount of light directly towards the viewer and will therefore make it extremely difficult, if possible at all, to observe objects placed behind it. As a result, by using the conventional lighting method, objects are always being illuminated from the side with respect to the line of sight. Here, it should be noted that transparent objects are sometimes illuminated from the rear to achieve clearer viewing. The transmissive microscope is one example that uses backlighting to avoid parallax associated with side lighting for precision inspection.

A serious problem associated with the side illumination method is difficulty in observing detailed features of an object because of shadows and parallax effects. Small objects in deep holes in some medical inspection techniques as well as precision scientific and mechanical studies are particularly difficult to observe with side lighting. As an example, a dentist very often has to use a rather sophisticated lighting system and at the same time requiring that the mouth of a patient be stretched to the limit in order to observe teeth in detail. Another major problem associated with side illumination is the low energy efficiency. Because a relatively long distance between the light source and the object has to be maintained, an area much larger than the size of the object usually has to be illuminated with side lighting.

As will be seen hereinafter, with the transparent front-lighting system of the present invention, the lighting system can be placed directly on top of the object so that all of the light is effectively used for illuminating the object. Transparent direct lighting is particularly valuable for some molecular biomedical studies that use ultraviolet (UV) light to observe molecules labeled with a fluorescent material. The direct lighting approach of the present invention is not only highly efficient in its use of UV light from a lamp but also has the added advantage that the output UV light is directed toward the object and away from the observer so that the operator will not be exposed to excessive UV light irradiation which is harmful to the operator's health. It is possible to use a beam splitter (which transmits approximately 50% of light and reflects the other 50%) for transparent direct front illumination. However, a sophisticated and bulky, optical arrangement requiring precision alignment is necessary for such an approach. A beam splitter based transparent front lighting system is, therefore, not widely used in practical application.

SUMMARY OF THE INVENTION

As will be described in more detail hereinafter, a system especially suitable for illuminating the front side of an object, as viewed by an observer, is disclosed herein. In accordance with the present invention, this system includes a light pipe assembly having opposing forward and rearward faces; an arrangement for directing light, not necessary visible light, into the light pipe assembly in a predetermined way; and an arrangement of optical components forming part of the light pipe assembly. This latter assembly is provide for reflecting substantially all of the light directed into the light pipe in a forward direction through the forward face of the light pipe. The light pipe assembly including the arrangement of optical components is substantially transparent to visible light or electromagnetic wave of a particular wavelength in the direction across the opposing forward and rearward faces of the assembly such that the light pipe assembly can be positioned between the object being illuminated and the observer or the detector without in any significant way disrupting the observer's or detector's view of the object.

As will be seen, the system just disclosed is especially suitable for illuminating articles such as watches, maps, road signs, reflective displays and the like. It is also especially suitable for illuminating an object such as a gel containing DNA with ultraviolet light.

DESCRIPTION OF THE DRAWINGS

The present invention will be described in more detail hereafter in conjunction with the drawings, wherein.

DETAILED DESCRIPTION OF THE PREFERRED EMBODIMENT

Figure 1A:
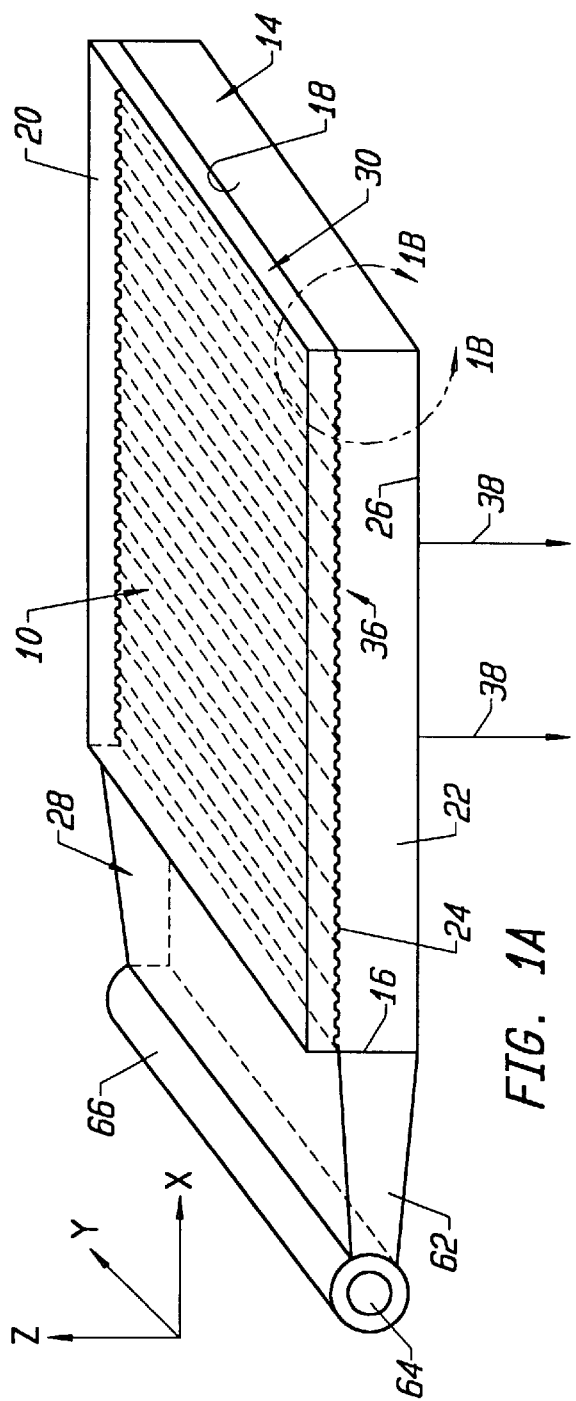
FIG. 1A illustrates an enlarged detail of assembly of FIG. 1.
Figure 1B:
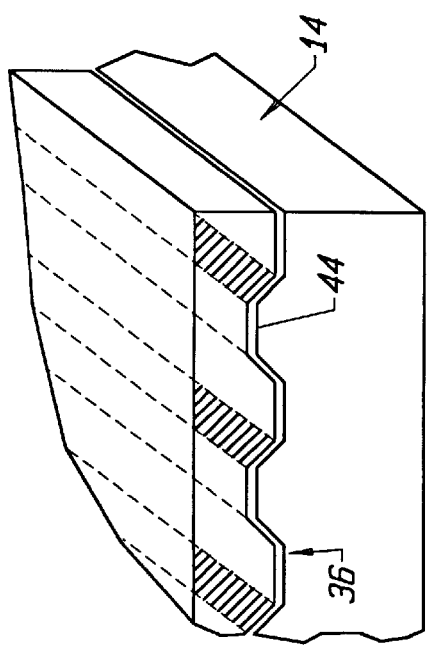
FIG. 1 is a perspective view of a transparent front-lighting assembly which is designed in accordance with the present invention, the front-lighting assembly being shown in an x, y, z coordinate system for the purpose of convenience.

Turning now to the drawings, wherein like components are designed by like reference numerals throughout the various figures, attention is first directed to FIG. 1 which shows a transparent front-lighting system using a miniature fluorescent lamp 64 as the source of light. As indicated above, this figure illustrates in perspective view an assembly designed in accordance with the present invention for front-lighting an object 12 placed directly underneath it. The assembly is shown at 10 in an x-y-z coordinate system. An observer, located in the +z side of the assembly, looks at an object located in the -z side through this transparent assembly. Assembly 10 includes a front-lighting light pipe 14 which extends in both the x-direction and y-direction, between opposite ends 16 and 18 and opposing ends 20 and 22, and has opposing top and bottom surfaces 24 and 26 respectively, extending horizontally (in the x-y plane). An arrangement indicated at 28, is provided for directing light into the light pipe at its entry end 16. End 18 includes a light reflecting surface for reflecting light back towards entry ends 16.

Still referring to FIG. 1, front-lighting assembly 10 also includes an arrangement 36 of immediately adjacent microprisms 44 extending in the x-y plane and serving as the top surface of light pipe 14. Each of the microprisms 44, as illustrated in FIG. 1A, has a trapezoid cross section with a rectangular top and base and two light-reflecting sides. The top surface is parallel to the bottom surface of the light pipe. For the moment, it suffices to say that this arrangement of microprisms may be constructed of any suitable transparent material such as glass, acrylic or polycarbonate having the same or approximately the same index of refraction as the light pipe 14. Arrangement 36 may be a separately made, distinct arrangement, for example from a separate sheet having a convex prism-featured underside, in which case the arrangement could be readily bonded to the top surface of the light pipe by means of a suitable adhesive having the appropriate index of refraction so as to be transparent to light passing between the light pipe and microprisms. On the other hand, the arrangement of microprisms could be made an integrated part of the light pipe. On the top of the microprisms 44 is a compensating plate 30, which function will be described in more detail hereinafter in conjunction with FIGS. 4 and 5.

As will be seen hereinafter, as light is introduced into the light pipe at its entry end 16, for example, by means of arrangement 28, light is reflected downwards through bottom surface 26 in the direction of an object 12, as indicated by arrows 38. As will also be seen, this arrangement of microprisms 44 and arrangement 28 are designed to cooperate with one another so as to ensure that all or substantial all of the light 38 coming from the lamp and impinging on the surface of microprisms will be reflected by total internal reflection downward, and substantially none of the light from the lamp will transmit through the microprism surface and propagate upward. With this approach, a viewer located above the light pipe will be able to see the illuminated object and not be blinded by light coming directly from the illuminator, which is the light pipe in this case.

Figure 2:
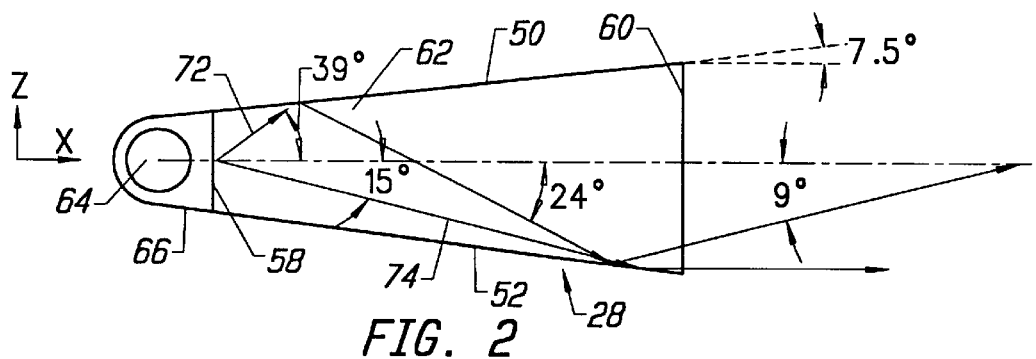
FIG. 2 is a sectional view of a light directing arrangement forming part of the assembly of FIG. 1, taken in x-z plane.
Figure 2A:
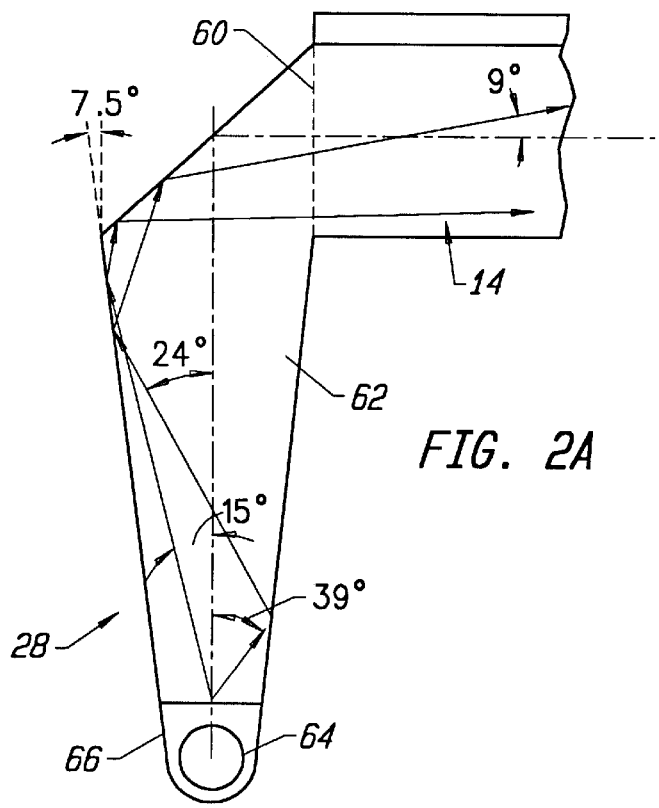
FIG. 2A is a sectional view of a light directing arrangement forming part of the assembly of FIG. 1 in accordance to an embodiment in which a light collimating light pipe forming part of the arrangement makes an angle with the axis of a front-lighting light pipe forming part of the overall assembly.

Turning now to FIG. 2, a sectional view of the arrangement 28, the light source 64 and its associated fixture 66 is shown in the x-z plane. The arrangement 28 includes a reflection prism 62 extending to the entry side of the light pipe. The prism 62 has opposing top and bottom surfaces 50 and 52, and opposite ends 58 and 60. Light entering the prism in the x-z plane has a maximum divergence angle determined by the index of refraction of the material that the prism is made of (39° if the prism is made of polycarbonate which has an index of refraction of 1.59). Here it should be noticed that conventional methods for collimating, such as the use of a reflecting parabolic mirror cannot achieve the required collimation due to the relatively large size of the light source in comparison with the thickness of the light pipe. It should also be noted that the plane containing the light collimating light pipe may make an angle with the plane containing the front-lighting light pipe as is shown in FIG. 2A. The arrangement in FIG. 2A is desirable for situations where there is limited room available for the light injecting section 28.

To collimate light into a desired divergence range, for example, ±9°, the top and bottom surfaces 50 and 52 are constructed at a tilt angle, for example about 7.5°, with respect to the x-axis, as illustrated in FIG. 2. As an example, light ray 72, which enters the reflection prism at a divergence angle of 39° with respect to the x-axis, will be reflected by the top surface 50 and then the bottom surface 52 of the reflection prism. With each reflection, the light ray will have its divergence angle decreased by 15° for a 7.5° tilted surface. As a result, the light ray 72 leaving the collimating section will have a divergence angle of 9° which is within the desired maximum divergence angle of ±9°. However, light rays, such as ray 74, which has a smaller initial divergence angle, for example 20°, will be reflected by the surface of the collimating light pipe only once within the entire light collimating assembly and will have its divergence angle decreased by 15°. In addition, light with divergence angle less than 7.5° will not hit the surface and propagate through the collimating assembly with its direction unchanged. With a properly constructed collimating assembly, light rays with any incident angle will be collimated to have a divergence angle less than ±9°. The divergence angle may be further reduced by additional reflections at the tilted surfaces which may have its slope varied along the x-direction. Since all changes in propagation direction are a result of total internal reflection, there is no loss in their intensities. Although it is possible to use a conventional reflection surface, such as a plated mirror, to collimate the light, it is far more efficient to collimate light by using a reflective surface based on total internal reflection. It is also to be understood here that the sides of the light collimation section may have a curved surface or even consist of segments of flat and curved surfaces for effective light collimation. Although multiple reflection is needed for highly collimated light output, single reflection may be adequate for some applications. For applications that do not require highly collimated output, the light collimation section may even be totally omitted.

Another important purpose of collimating light is to ensure that, with total internal reflection, no light will exit the light pipe and propagate in the direction towards the viewer so that the viewer will see the object with a contrast ratio not degraded by light coming directly from the light pipe.

Figure 3:
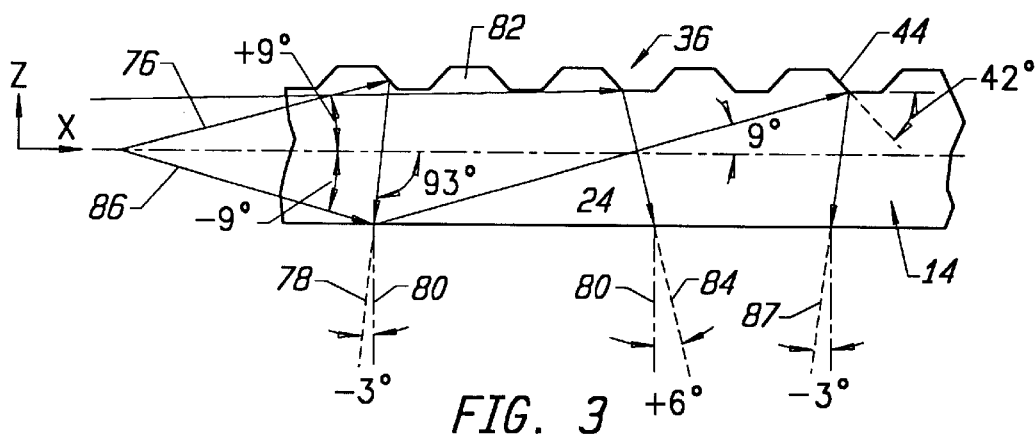
FIG. 3 is a sectional view of a portion of a light pipe forming part of the front-lighting assembly of FIG. 1, specifically illustrating the way in which light enters and exits the light pipe.

Having described the way in which light from source 64 is directed by means of the light directing assembly 28, attention is now directed to the way in which the front-lighting light pipe 14 in cooperation with microprism arrangement 36 acts on the input light to provide output front-lighting 38. To this end, reference is directed to FIG. 3 which gives a cross sectional view of light pipe 14 in the x-z plane. For the purpose of this discussion, it will be assumed that the maximum divergence angle at which light enters the backlighting light pipe is ±9° as depicted in FIG. 3. In the particular embodiment illustrated in FIG. 3, each prism has its surface facing the light entrance side, making an angle of 42° with a plane parallel to the top surface of the light pipe. It is to be understood that the present invention is not limited to these particular physical parameters. The material as well as the angle that the surface of the microprism makes with the top surface of the light pipe may all have different values. The reflecting microprisms may even have curved surfaces.

Still referring to FIG. 3, note specifically that the incoming light beam 76, which deviates by ±9° from the x-axis, will hit the surface of a prism, be bent by 84° and then propagate in the direction 78 which deviates by −3° from the normal 80 of the bottom side 24. Light beam 82 which propagates nearly parallel to the x-axis will be bent by 84° also and propagate in the direction 84 which deviates by +6° from the normal 80. Light beam 86 which initially deviates by −9° from the x-axis will hit the bottom surface 24 and then propagate upwards whereupon it will be reflected by one surface of a microprism in a way similar to light beam 76, thereby propagating in the direction at an angle of −3° with the normal 80. This process happens to all light beams, making a negative angle with the x-axis. As a result, light beams exiting the light pipe through the bottom surface 24 in the x-z plane will be collimated to one-half their original divergence angles, that is, one-half the angle at which light enters the light pipe 14. With the maximum divergence angle of light coming from the light collimating section equal to or less than the critical angle of refraction with respect to the surface of the microprisms, no light can escape the light pipe and enter the observer's side.

In the particular example just described in conjunction with FIG. 3, it was assumed that the microprism 44 makes angles of 42° between its side surface and the x-axis which is parallel to the plane of the bottom surface of the light pipe. For the purpose of coupling light out of a light pipe, the prism-array should have an angle determined by the allowed divergence angle, output light propagation direction, and the index of refraction of the light pipe.

For applications that illuminate flat objects placed immediately underneath the transparent front illuminator, such as a sign, a reflective display or a piece of fine art, output light is not required to exit in the direction perpendicular to the bottom surface of the light pipe. In this case, the side surface of the microprisms facing the lamp may be arranged properly, for example being tilted at an angle smaller than 42° with respect to the x-axis, to accommodate total internal reflection for light with a larger allowable divergence angle. Using materials of very high index of refraction, such as the SF59 optical glass which has an optical refractive index of 1.97, collimation by multiple reflection may be unnecessary for certain applications and the collimation section may be reduced or even be totally omitted. For practical application, there is no restriction on the size and repeat distance of the prisms as long as they can be conveniently manufactured and can illuminate objects with adequate uniformity.

Figure 4:
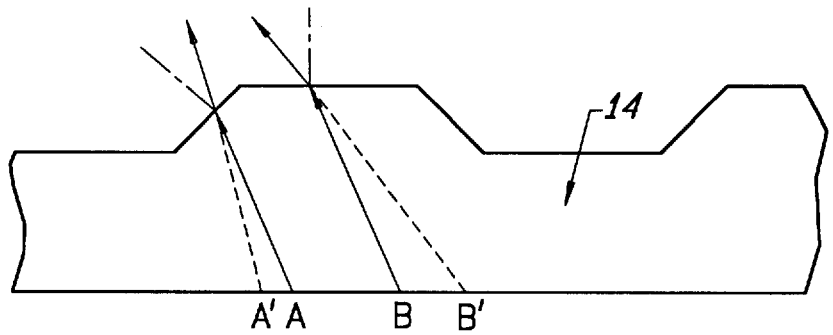
FIG. 4 illustrates the formation of image distortion of an object illuminated by the light pipe and viewed through the light pipe.

Before describing the mechanism of a compensating plate indicated at 30 in FIG. 1, we turn to FIG. 4, which shows schematically a bound of parallel light rays from an object propagating towards a viewer through a front-lighting light pipe not accompanied by a compensation plate 30 in FIG. 1. An image distortion formed by light rays passing through the different surfaces of a microprism will appear as multiple images because these surfaces have different slopes. In the example illustrated, the amount of distortion is equal to $\overline{AA'}$-$\overline{BB'}$. Here it should be pointed out that, with the microprisms very small (100 microns or less) and the light pipe thin enough, the amount of the image distortion will not be noticeable. For some application, even the smallest image distortion cannot be tolerated. In this case, a compensating plate, shown at 30 in FIG. 1, can be used to eliminate the image distortion.

Figure 5:
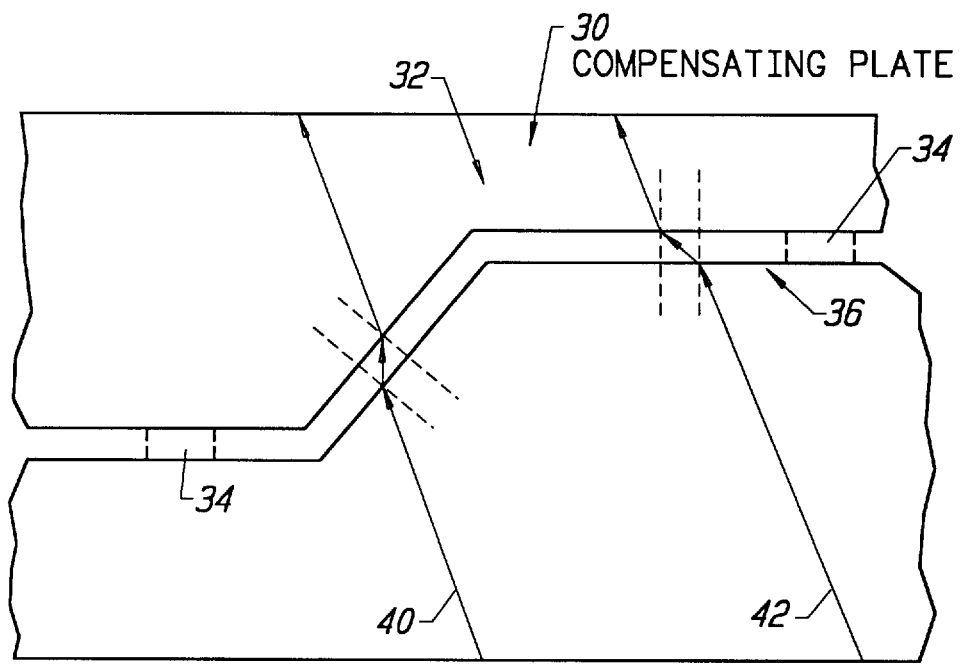
FIG. 5 is a sectional view of a portion of the assembly showing the correction of image distortion by using a compensating plate.

FIG. 5 shows an enlarged view of the interfacing area of the light pipe 14 and the compensating plate 30 in FIG. 1. The compensating plate 30 is usually made of material of the same or similar index of refraction as the light pipe and has a structure 32 on its bottom surface of a shape that complements the arrangement of microprisms 36 on the top surface of the front-lighting light pipe. The compensating plate is placed on top of the light pipe and is separated from the light pipe by a thin air gap with a thickness maintained by microspacers 34 as illustrated in FIG. 1A and FIG. 5. The microspacers, of a thickness of the order of microns, may be in the form of small plastic or glass disks or balls. The spacer may also be made an integral part of the light pipe or the compensating plate when they are manufactured by molding, compression or other technique. The spacers should have a thickness larger than the coherence length of light coming from the light source to ensure that no interference fringes will be generated. With a non-coherent light source such as a fluorescent lamp, the coherence length of light wave is in the order of wavelength, that is, less than 1 micron.

As shown in FIG. 5, two parallel light rays 40 and 42 coming from a object, exit the light pipe from the inclined left side of a microprism. The light ray 40 will be bent towards the right side when it enters the air gap from the light pipe. However, this light ray will be bent left by the same angle when it enters the compensating plate. As a result, this light ray will propagate in its original direction inside the compensating plate. Similarly, the light ray 42, exiting the light pipe from the top surface of a microprism will also propagate in its original direction when it enters the compensating plate. As a result of traveling an equal optical path, both light rays 40 and 42 will remain parallel when they pass through the surfaces between different mediums and the image distortion is eliminated. The device is therefore distortion free.

Figure 6:
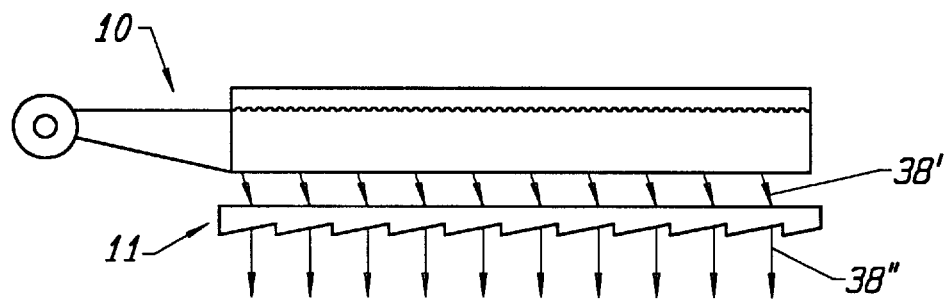
FIG. 6 is a sectional view of a transparent front lighting assembly in accordance to an embodiment that uses a Fresnel lens to deflect the direction of the output light.

For applications that do not need output light propagating in the perpendicular direction, such as illuminating pictures or road signs attached directly to the transparent front-lighting assembly, the air gap between the light pipe and the compensating plate may be replaced by a layer of optical thin film coating. The compensating plate may now be a layer of plastic or other optical material manufactured to "coat" directly on top of the coated light pipe by (compression) molding or other method. An example of using film coating technology to make a transparent front-lighting system is given below. The light pipe is made of BaSF52 optical glass which has refraction index of 1.71. The critical angle is 35.8°. The top and bottom surfaces of the collimating zone each make an angle of 6.7° to the bottom surface of the transparent front lighting light pipe. The light can be collimated to a divergent angle of less than 9° before entering the section of front-lighting light pipe by using the multi-reflection technique discussed above. The surface of the microprisms facing the lamp is now manufactured to make an angle of 28.8° to its base. A thin film of cryolite ($Na_3AlF_6$, with a refraction index of 1.35) is now coated on the top surface of the light pipe to give a critical angle of total internal reflection of approximately 52° at this interface. A thin film of polycarbonate is then molded on top of the cryolite coating layer to form the compensation plate. Since the refraction index of polycarbonate and cryolite differ only slightly, the compensation, although not complete, is sufficient for non-critical applications. All light rays coming from the lamp and hitting the surface of the microprisms will be totally internally reflected and come out of the bottom side of the light pipe with its propagation direction distributed 42° to 65° from normal to the bottom surface of the light pipe. With a flat object placed directly underneath the thin transparent front-lighting light pipe, deviation of the output light from the normal direction does not affect its illumination. Here it should be noticed that, if necessary, a Fresnel lens may be placed on the output side of the light pipe to make the output light propagate in the normal direction as illustrated in FIG. 6. As is shown in FIG. 6, the output light 38' is deflected by the Fresnel lens 11 to the normal direction, exiting the system as 38".

Although it is always desirable to avoid any image distortion in order to have a high quality image of an object illuminated by the transparent front-lighting assembly, an unnoticeable amount of image distortion in the form of multiple images is tolerable. As an example, a window glass in a lighted room looks just like a mirror to an observer in that room when it is dark outside. However, when it is much brighter outside, the image formed on the same window, although it still exists, is usually unnoticeable to the same person located in the same room.

Figure 7:
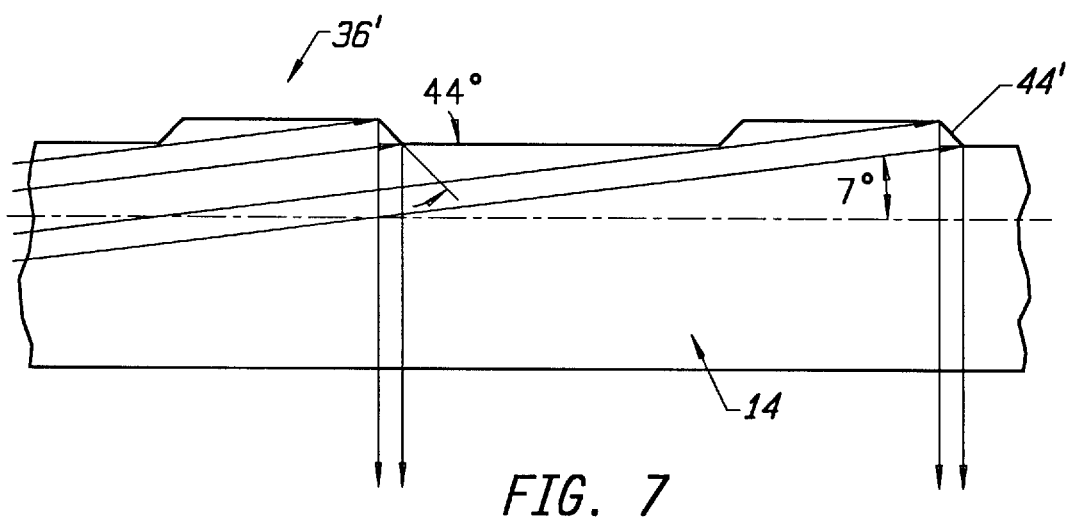
FIG. 7 is a sectional view of a portion of a light pipe designed in accordance to an embodiment that uses microprisms with significantly increased areas parallel to the light pipe face.

As long as the relative amount of image distortion is unnoticeable, a reasonably good image can still be achieved using a transparent front lighting assembly without using a compensating plate. An approach to make a transparent front lighting system resulting in minimize image distortion without using a compensating plate will now be described in detail. As illustrated in FIG. 7, light inside the light pipe for example light pipe 14 is highly collimated so that the microprisms can be designed with a substantially large flat top area so that most of the light reflected from an object will pass through the flat area on top of the light pipe without suffering any distortion. In an example of this embodiment, the light pipe is made of polycarbonate. With a properly designed multi-reflection light collimating section 28, light is collimated to have a maximum divergence angle of ±7° before entering the light pipe. The side surface of a microprism in the arrangement 36' facing the lamp 44' is now making an angle of 44° with the bottom surface of the light pipe so that all of the light coming from the lamp and hitting this surface will be totally reflected downward. Since no light inside the light pipe has a divergent angle larger than 7°, the height of microprisms can now be reduced so that an angle of 7° will be spanned by this inclined side surface to a point located at the edge of the base of the microprism, away from this side surface, without affecting its light reflecting performance. With this design, the area of the flat top surface of each microprism will be between approximately 80% and 90% of its base area. If the distribution of microprisms over the surface of the light pipe are made in such a way that the space between adjacent microprisms is at least equal to the base width of each one of them, then the main image of an object, formed by light passing through the flat area on the top surface of the light pipe, will be at least 20 times the brightness of a distorted image formed by light coming from the object and passing through one of the side surface of each microprism. With the major part of the image undistorted, the tiny amount of distorted images may not be noticeable to human eyes, and the quality of the picture may become acceptable.

Another factor to be considered in dealing with the image distortion is resolution. Some objects have much larger features than the dimension of the distortion and, therefore, will not require perfect imaging. As an example, a resolution of 0.5 cm may be acceptable for a road sign's illumination since the width of the features on the sign is at least that wide. A compensating plate is not needed when a flat transparent front-lighting light pipe can be made with a resolution higher than the required resolution of the object to be observed.

Figure 8:
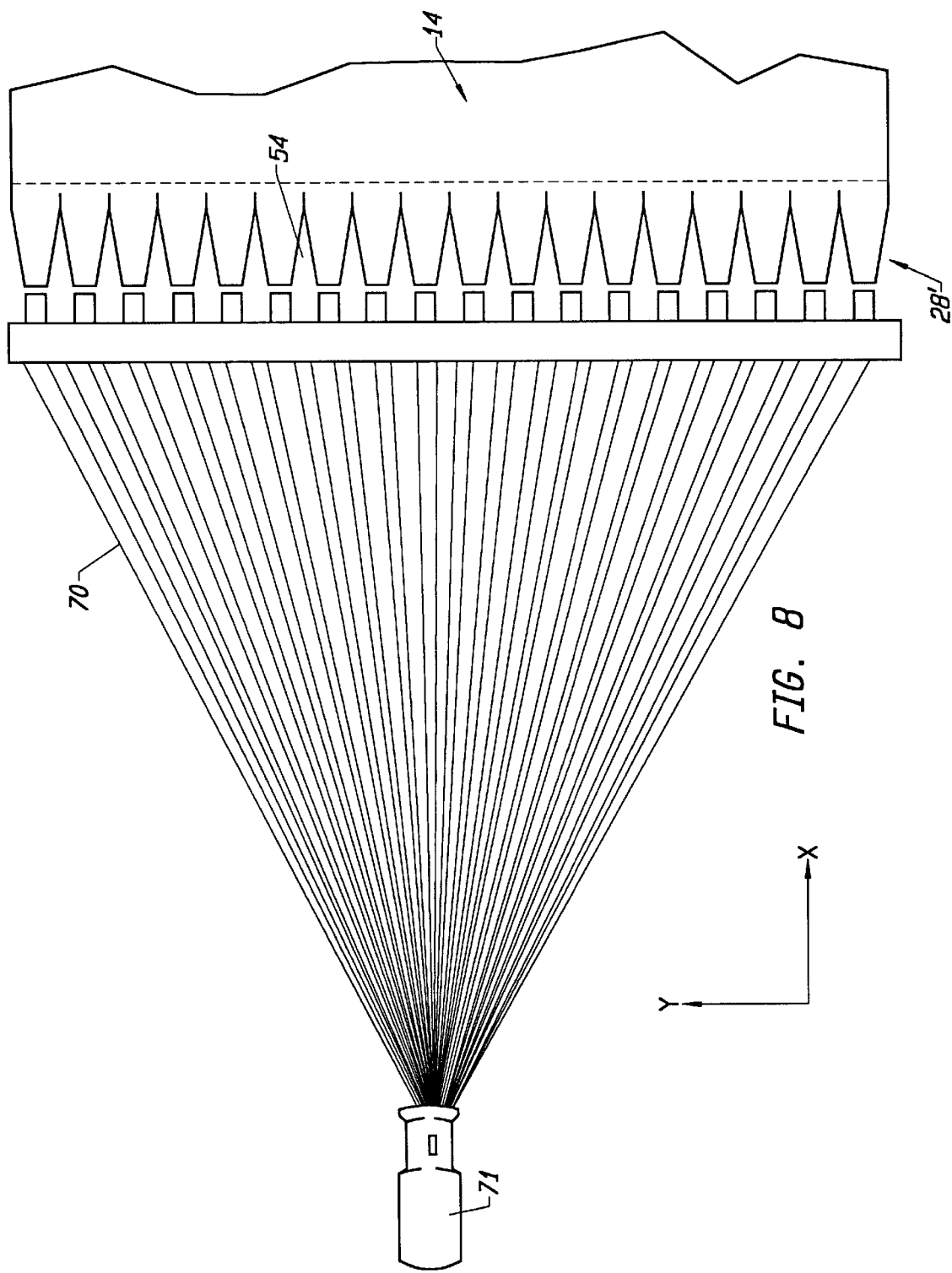
FIG. 8 is a top view of a light pipe designed for the assembly in accordance to an embodiment that uses multi-channel light injection for injecting light into the light pipe and an optical fiber to send light from a remote source to the light pipe.

FIG. 8 shows a design, a further embodiment, which can provide output light collimated to a certain degree in both dimensions (x-z and x-y) and is particularly suitable for using optical fibers to bring light generated from a remote source to front-lighting objects. In this embodiment, the light collimating section 28' includes a row of prisms 54 forming a multichannel light collimating section. With the light collimating mechanism in the x-y plane identical to that in the x-z plane discussed before, light can be collimated in both dimensions by multiple reflection inside the individual collimating prisms before entering the backlighting light pipe 14. In this embodiment, optical fiber 70 can be used to couple light generated from a remote light source 71 into the entrance side of the light collimating prisms 54.

Figure 9:
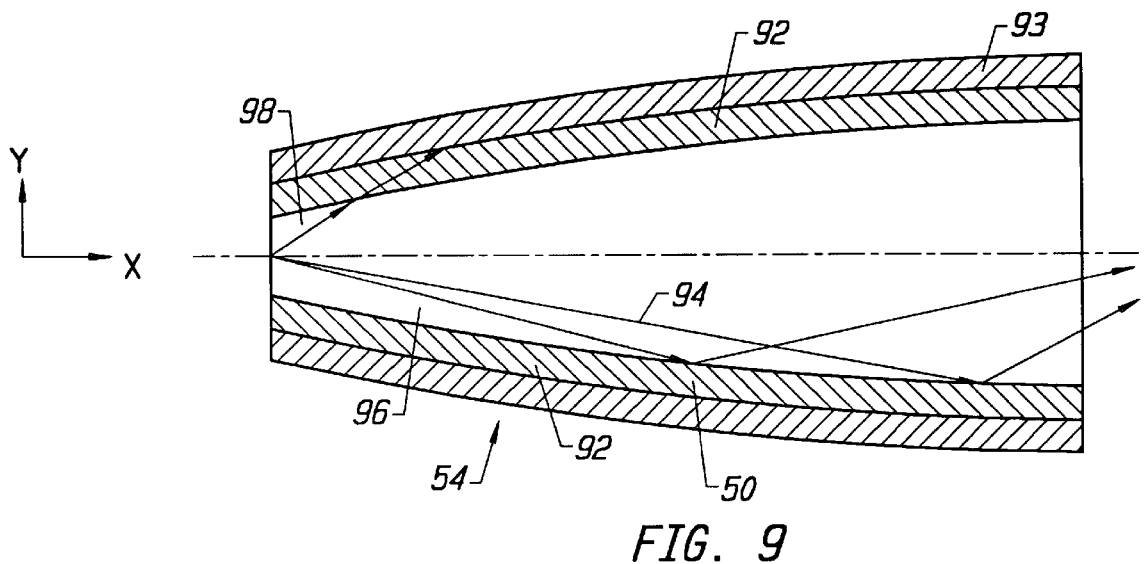
FIG. 9 is a sectional view of a portion of a coated light pipe which is one of the channels forming a multichannel light injection system.

In order to ensure that no light of a divergent angle larger than a certain value can enter the front-lighting light pipe, part or all of the surface of the light collimating prism 54 may be coated with an appropriate material, such as an optical polymer, as shown in FIG. 9, to limit the critical angle of total internal reflection to within a certain maximum value. With this approach, light 98 with a divergence angle outside this value will be transmitted into the coating layer 92, reaching the painted outer surface 93 of the coating and being absorbed there. Light at a deviation angle within this particular maximum value, however, will be reflected by total internal reflection and will have its angle corrected by the surface 50' without any loss of intensity. This approach can therefore make the output light highly collimated even with a very thin total system thickness. It is suitable for applications such as a light emitting goggle which needs a thin and light weight transparent front lighting system.

Figure 10:
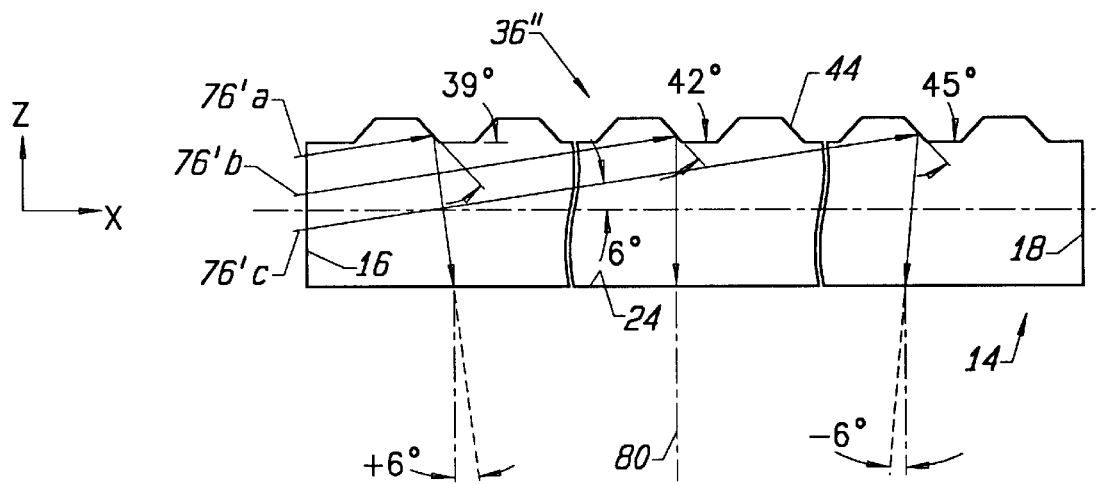
FIG. 10 is a sectional view of three portions of a light pipe forming part of a front lighting assembly in accordance to the embodiment that uses microprisms with various tilt angles, especially illustrating the way in which parallel running light exits the light pipe in different direction.

For some applications, a predetermined divergence angle of output light is required for a front-lighting system. Sometimes it may be desirable to have the output light propagation direction varied along the surface of the light pipe. For example, one might like to have the light coming from the right hand side of a light pipe tilted slightly towards the left and the light coming out from the left side tilted right as the light propagates towards an object so that output light will be focused at the object for efficient illumination. FIG. 10 illustrates a particular arrangement of microprisms in a light pipe to meet this kind of requirement. In FIG. 10, each microprism 44" has its symmetry axis tilted systematically along the surface of the light pipe at some acute angle rather than normal to the surface of the light pipe as illustrated in, for example, FIG. 3. As a result, parallel light rays 76'*a,* 76'*b* and 76'*c* in FIG. 9, which enter the light pipe 14 with the same deviation angle, exit the light pipe towards different directions since they are reflected by prisms making different angles with the surface of the light pipe. By alternating the tilt angle of individual prisms, the propagating direction of output light can be manipulated to meet a wide range of specification. In another example, a wider divergence angle may be a major concern. In this case, a more sophisticated arrangement may be needed to govern the tilt angle of odd numbered and even numbered microprisms respectively. The difference in tilt angle of two adjacent microprisms is given by the required value of divergent angle of the output light. If necessary, the tilt angle of three or more adjacent microprisms in sequence can be adjusted to give a sufficiently large divergence angle.

Figure 11A:
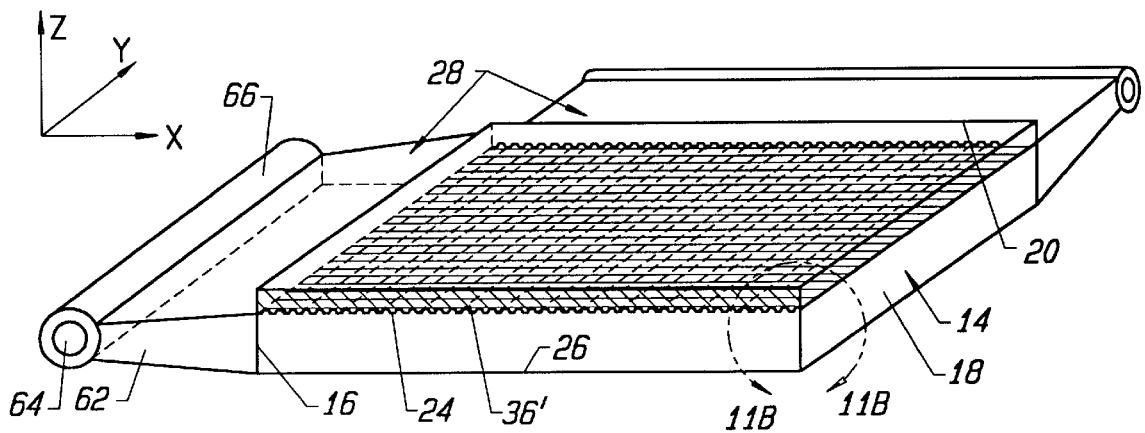
FIG. 11A illustrates a detail of the assembly of FIG. 11.
Figure 11B:
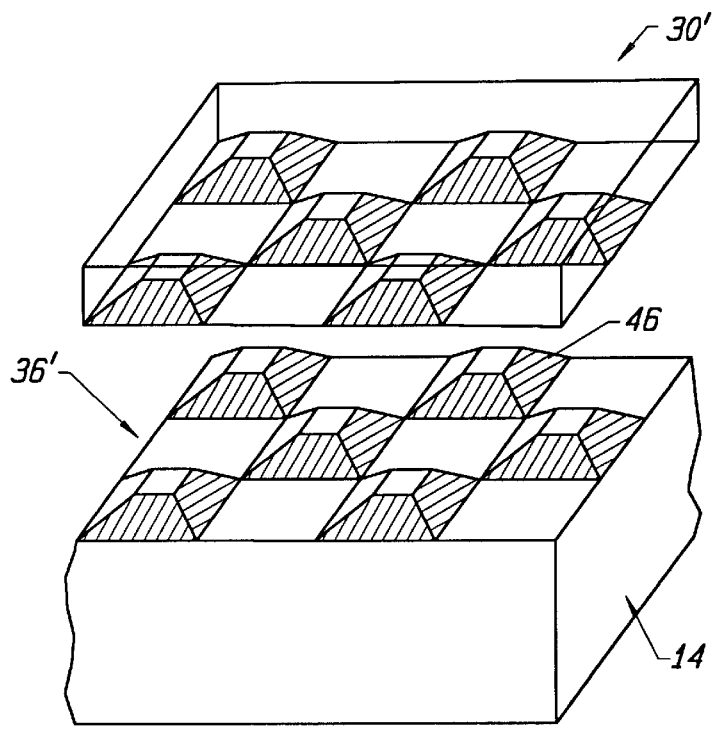
FIG. 11 is a perspective view of a light pipe for the assembly in accordance to an embodiment that employs two light sources at two adjacent sides.

An embodiment that can provide very bright front lighting by using up to four lamps is shown in FIG. 11 and FIG. 11A. In this embodiment, an arrangement of immediately adjacent micropyramids, extending in the x-y plane with their bases parallel to the x and y axis respectively are shown. These micropyramids extend along the entire extent of and serve as the top surface of light pipe 14. They are used to replace rows of long microprisms used in previous embodiments. In the particular embodiment illustrated in FIG. 11, each of the micropyramids and generally indicated at 46, has a trapezoid cross section with its top surface parallel to the bottom surface of the light pipe. The light collimating light pipe 28 of the form shown earlier may be placed on all four sides of the front-lighting light pipe shown in FIG. 11 to give a very bright output light. The compensating plate 30' in this particular embodiment also has a arrangement of pyramids that complement the micropyramid structure 46 on the light pipe 14 as illustrated in FIG. 11A.

With the front-lighting system transparent, extremely bright front-lighting may be achieved by stacking two or more transparent flat front-lighting light pipes together. In addition to providing a front-lighting system with a significantly higher brightness than what is provided by a single light pipe, the stacked front lighting system may also be used for special applications such as image superposition.

In theory, the transparent front-lighting system is designed to emit light only towards one side. However, in practice, defect caused scattered light and light entering the light pipe from its side surfaces may have its incidence angle smaller than the critical angle when it hits the prism surface, and the light may leak into the viewer's side. Since light propagating directly from the light pipe towards the viewer will reduce the contrast ratio of images, it is desirable to have the system made in such a way that leakage results from defect and light entering the light pipe from a bright environment will be minimized. Below, an embodiment will be disclosed that will achieve this goal.

Figure 12:
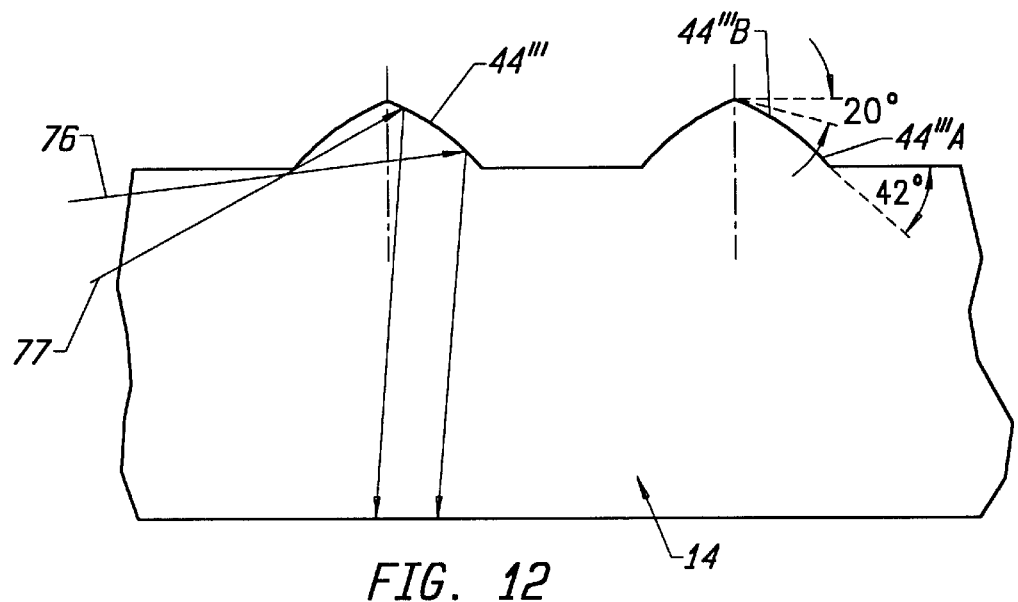
FIG. 12 is the cross sectional view of a microprism with its surface composed of a flat and a curved section, illustrating the way in which light with different divergent angles is reflected by the prism.

Although it is impossible or difficult to prevent all light from entering the viewer's side completely, the amount of that light can nevertheless be reduced by using microprisms of a curved surface. As is shown in FIG. 12, the surface of each of the prisms in the embodiment shown in FIG. 1 is now comprised of two parts, a flat surface area 44'''*a* near its base and a curved surface 44'''*b* everywhere else. With the divergence angle of light entering the light pipe 14 designed to have a maximum value of, for example, 9°, the flat surface which makes an angle of 42° to its base, will span an angle of 9° to a point located at the edge of the prism's base away from this flat surface. The slope of the curved surface on the other hand decreases from 42° to, for example, 20° with respect to the prism base. Since a light ray 76 with its divergence angle within its designed value, ±9°, will hit only the flat surface, the performance of the system is not affected by this design if no light ray has a divergence angle larger than 9°. However, if a light ray 77 of a larger divergence angle hits the side surface of this microprism, it will have a certain probability of hitting the curved surface where the tangent makes a smaller angle to the base of the prisms. Since the larger the divergence angle of entering light rays, the further up on the side surface they can hit, the surface profile of the microprisms can therefore be designed to totally reflect even some light with a very large divergence angle downward to illuminate the object, instead of the observer. Furthermore, even for light that is actually transmitted through the curved surface, it will bend away from the normal direction by a larger angle then a similar light beam hitting the flat surface. This is because the light beam of a given divergence angle makes a larger angle of incidence when it hits the curved surface than the flat ones. Microprisms with at least part of its surface curved will therefore give a higher illumination efficiency as well as an improved image contrast ratio.

Figure 13:
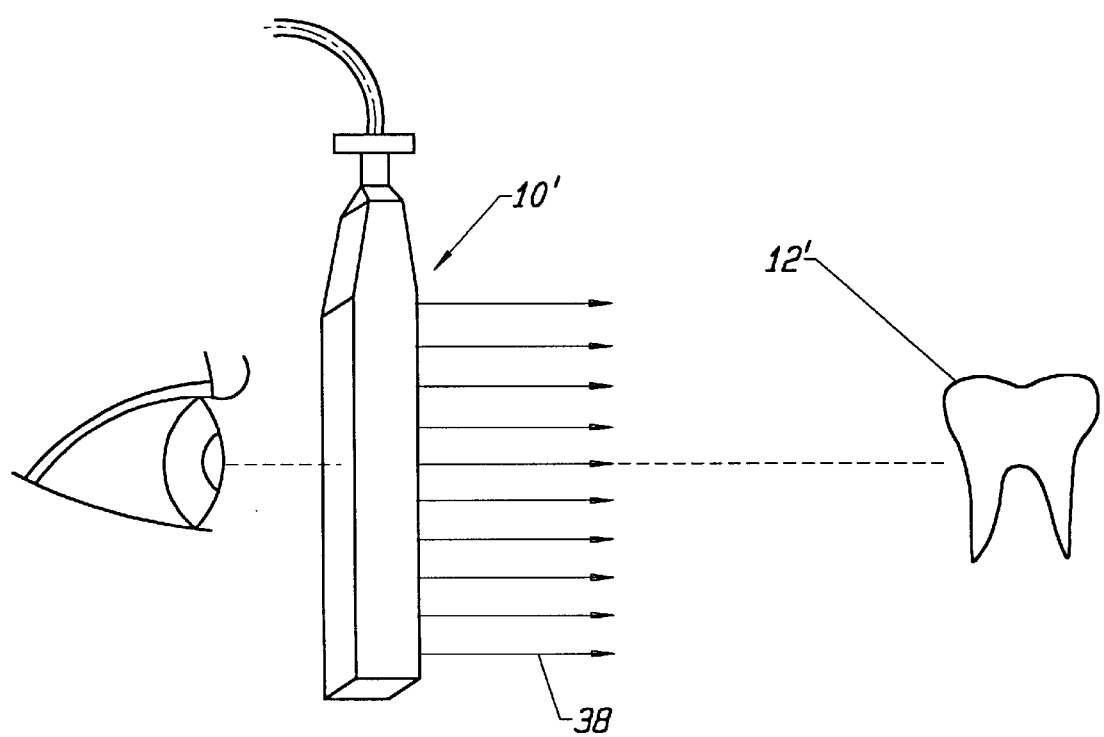
FIG. 13 illustrates the application of a transparent front lighting goggle based on the present invention
Figure 14:
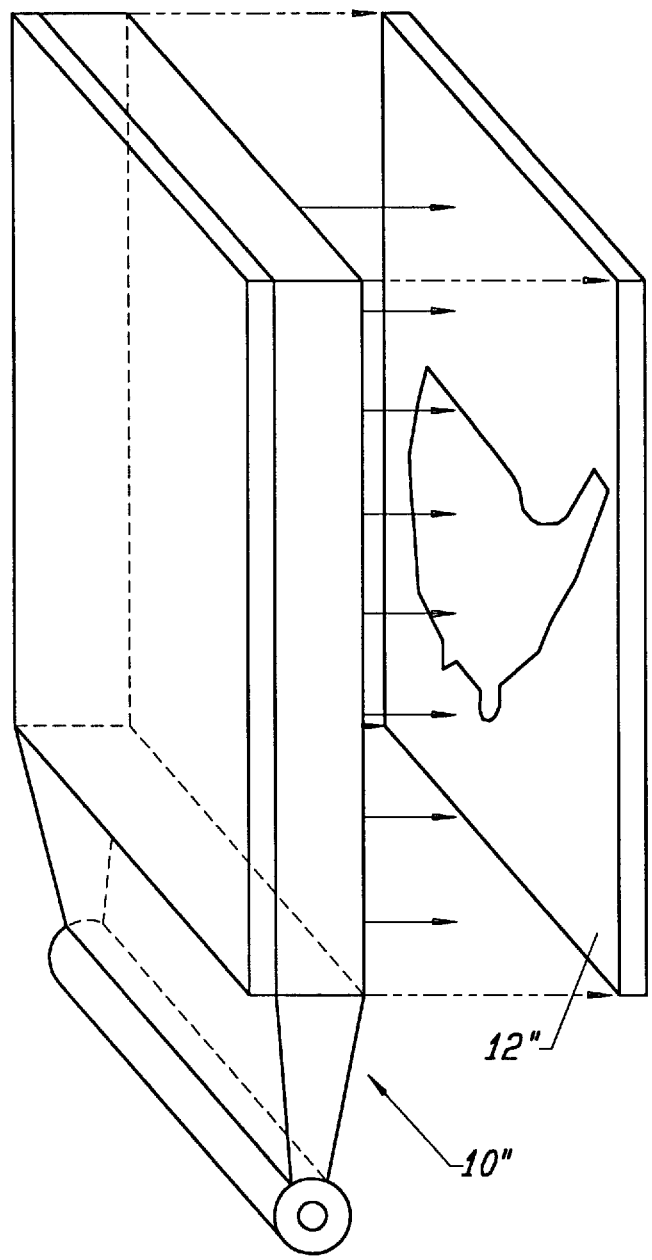
FIG. 14 illustrates the arrangement of a transparent front lighting system based on the present invention to illuminate a map, a sign or other such article.

The various embodiments of the transparent front lighting assembly disclosed herein will find a wide range of applications. FIG. 13 illustrates the use of a light emitting goggle 10' constructed in accordance with the present invention. This kind of light emitting goggle is particularly useful for inspection of a tiny object 12' located in a deep hole with a small opening, such as a tooth. FIG. 14 illustrates a light emitting front window 10" constructed in accordance with the present invention used to illuminate a map 12". In this kind of applications, the illuminated article can be a sign, a watch or a reflective display. This kind of light emitting windows are specially desirable where an article cannot be illuminated by using a backlight and an external light assembly is inconvenient or impossible.

One particular example of applications of the transparent front lighting assembly is a device for an ultraviolet fluorescence study of electrophoresis gels. This device will be explained in detail to demonstrate the significance of the present invention.

Existing devices studying fluorescence of DNA in gels irradiated by UV illumination use conventional backlighting technique. Since the gel contains water which absorbs UV light, the conventional design uses high intensity UV light, approximately 8000 $\mu$ W/cm2, to observe fluorescence of minute amounts of DNA in the gel. Since the strong UV light is propagated towards the operator with the conventional lighting technique, the viewer's body faces the danger of being exposed to strong UV light exposure especially when he/she cuts off the gel bands that fluoresces under UV illumination for research or other applications. Since exposure to strong UV light may cause serious damage to his/her health, in particular to his/her eye and skin, it is desirable to have devices with new technology that not only give high resolution and sensitivity in the gel fluorescence bands but also subject the operator to less exposure to UV light. Here we would like to demonstrate that the transparent front lighting technology can achieve these goals.

With the front lighting assembly of the present invention, the side of the gel facing the viewer will now be illuminated by UV light directly. Since, with front lighting, the observed fluorescent light comes directly from this UV illuminated front surface of the gel, a fluorescent band can be observed easily with a high degree of sharpness. This is in sharp contrast to the conventional method in which the fluorescent light has to propagate through the gel, which causes scattering that degrades the sharpness and the brightness of the band that emits the fluorescent light. As a result, a brighter and sharper band can be observed with a front transparent lighting system, and UV light of a lower intensity may be used for studying the band. More importantly, by using the present front transparent lighting technology, the UV light propagates away from the viewer so that the viewer is much less likely to be exposed to UV irradiation, especially when he/she cuts the gel bands. The invented front lighting technology will therefore not only be much safer than the conventional back-lighting based technology, but also has advantages in achieving higher resolution and energy saving.

In the claims:

1. A system having a first side and a second side, said system for illuminating an object with exciting light on said first side of said illumination system to cause said object to fluoresce with light of a wavelength different from that of said exciting light, and so that said object may be viewed by an observer located on said second side of said illuminating system, said system comprising:

(a) a light pipe assembly having opposing forward and rearward faces, wherein said light pipe assembly includes means for insuring that visible light passing across the opposing faces of the light pipe assembly does so in a substantially undistorted manner, whereby the observer is able to view said object through the light pipe assembly substantially free of distortion;

(b) an arrangement for directing light into said light pipe assembly in a predetermined way, and (c) an arrangement of optical components forming part of said light pipe assembly for reflecting substantially all of the light directed into said light pipe assembly in said predetermined way in a forward direction through the forward face of said light pipe assembly, said light pipe assembly including said arrangement of optical components being substantially transparent to light in a direction across the opposing forward and rearward faces of said light pipe assembly such that said light pipe assembly can be positioned between the object being illuminated and the observer without in any significant way disrupting the observer's view of the object.

2. A system according to claim 1 wherein said means for insuring that visible light passing across the opposing faces of the light pipe assembly does so in a substantially undistorted manner includes an optical plate member extending over and adjacent to an array of immediately adjacent microprisms.

3. A light emitting goggle for generating directed illumination in a direction away from said light emitting goggle, said direction defining a forward direction, as viewed by an observer, comprising:

(a) a light pipe assembly having opposing forward and rearward faces which together define a direction across said opposing forward and rearward faces, wherein said light pipe assembly includes means for insuring that the visible light passing across the opposing faces of the light pipe assembly does so in a substantially undistorted manner, whereby the observer is able to view said object through the light pipe assembly substantially free of distortion;

(b) an arrangement for directing light into said light pipe assembly in a predetermined way; and;

(c) an arrangement of optical components forming part of said light pipe assembly for reflecting substantially all of the light directed into said light pipe assembly in said predetermined way in said forward direction through the forward face of said light pipe assembly, said light pipe assembly including said arrangement of optical components being substantially transparent to visible light in said direction across the opposing forward and rearward faces of said light pipe assembly such that said light pipe assembly can be positioned over the eve of the observer without in any significant way disrupting the observer's forward view.

4. A light emitting goggle according to claim 3 wherein said means for insuring that the visible light passing across the opposing faces of the light pipe assembly does so in a substantially undistorted manner includes an optical plate member extending over and adjacent to an array of immediately adjacent microprisms.

5. A light illuminated article such as a watch, a sign, a map, an artwork, or a reflective display, comprising;

(a) an article having a specific surface;

(b) a light pipe assembly having opposing forward and rearward faces and positioned over the specific surface of said article such that the forward face of said assembly is in confronting relationship with said specific surface, said opposing forward and rearward faces defining a direction across said opposing forward and rearward faces, wherein said light pipe assembly includes means for insuring that the visible light passing across the opposing faces of the light pipe assembly does so in a substantially undistorted manner, whereby the observer is able to view said object through the light pipe assembly substantially free of distortion;

(c) an arrangement for directing light into said light pipe assembly in a predetermined way; and (d) an arrangement of optical components forming part of said light pipe assembly for reflecting substantially all of the light directed into said light pipe assembly in said predetermined way in a forward direction through the forward face of said light pipe assembly and onto said specific surface of said article for illuminating the specific surface, said light pipe assembly including said arrangement of optical components being substantially transparent to visible light in said direction across the opposing forward and rearward faces of the assembly such that said specific surface can be viewed by the observer through the light pipe assembly with at most minimal distortion.

6. A light illuminated article according to claim 5 wherein said means for insuring that the visible light passing across the opposing faces of the light pipe assembly does so in a substantially undistorted manner includes an optical plate member extending over and adjacent to an array of immediately adjacent microprisms.

7. A method of illuminating an object having a specific surface, as viewed by an observer, comprising:
- (a) providing a light pipe assembly having opposing forward and rearward faces and positioning said light pipe assembly relative to said object such that its forward face is in confronting relationship with said specific surface, said opposing forward and faces defining a direction across said opposing forward and rearward faces;
- (b) directing light into said light pipe assembly in a predetermined way; and
- (c) incorporating into said light pipe assembly an arrangement of optical components for reflecting substantially all of the light directed into said light pipe assembly in said predetermined way in a forward direction through the forward face of the light pipe assembly and onto said specific surface of said object, said light pipe assembly including said arrangement of optical components being substantially transparent to visible light in said direction across the opposing forward and rearward faces of the assembly such that the light pipe assembly can be positioned between the object being illuminated and the observer without in any significant way disrupting the observer's view of the object, further including the step of insuring the visible light passing across the opposing faces of the light pipe assembly in a substantially undistorted manner, whereby the observer is able to view said object through the light pipe assembly substantially free of distortion.

8. A method of illuminating an object according to claim 7 wherein said step of insuring that the visible light passing across the opposing faces of the light pipe assembly does so in a substantially undistorted manner includes providing an optical plate member extending over and adjacent to an array of immediately adjacent microprisms.

* * * * *